Nov. 26, 1935.  E. R. MORTON  2,022,052
BELT DRIVE
Filed Sept. 8, 1934
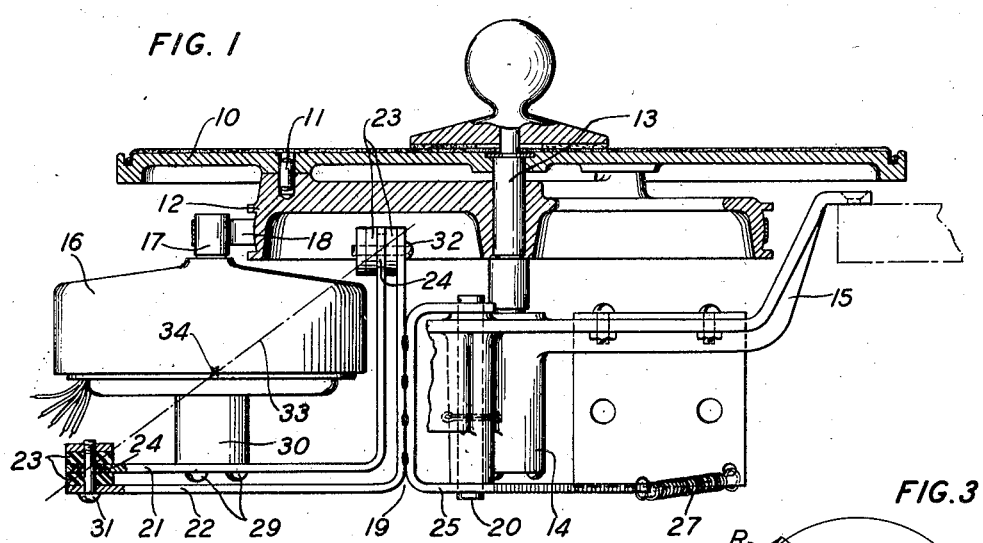
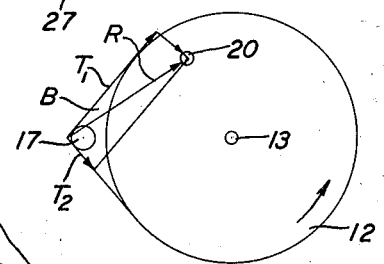
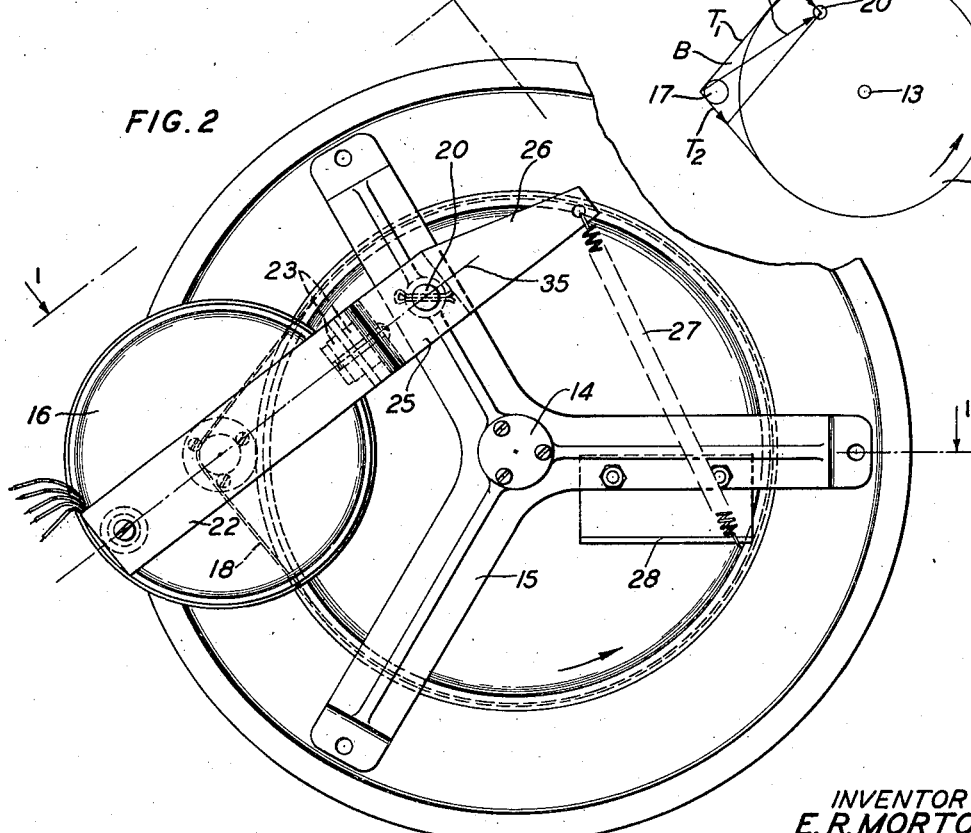
INVENTOR
E. R. MORTON
BY
ATTORNEY Patented Nov. 26, 1935

2,022,052

UNITED STATES PATENT OFFICE 2,022,052

BELT DRIVE

Edmund R. Morton, New York, N. Y., assignor to Bell Telephone Laboratories, Incorporated, New York, N. Y., a corporation of New York Application September 8, 1934, Serial No. 743,179

5 Claims. (Cl. 74—242.13)

This invention relates to mechanical power transmitting systems of the belt drive type and the object of the invention is a belt drive for such a system which is inexpensive, efficient and in which the vibrations of the driving member are not transmitted to the driven member.

In one embodiment of the invention particularly well adapted for driving the turntable of a phonograph, a synchronous hysteresis type motor is belt connected directedly to a pulley on the turntable shaft. The motor is supported on a bracket by means of upper and lower vibration absorbing mountings disposed in line with the resultant belt pull and approximately diagonally in line with the center of mass of the motor. The mountings are such that the motor is relatively rigid in the direction of the belt pull but free to vibrate in other modes to prevent the motor vibrations from reaching the turntable.

The bracket supporting the motor is pivoted and a slight initial belt tension is maintained by a suitable spring. The pivot axis of the bracket is on a radius line of the turntable and near enough to the spindle so that as the motor accelerates and the belt tensions become unequal, the resultant of the tensions is outside the pivot and increases the belt tension by swinging the bracket outwardly until the line of the resultant passes through the pivot. With this arrangement the bearing pressure is a minimum since the belt tension automatically adjusts itself to the value required to carry the load without belt slip.

If the pivot is located too close to the spindle and the turntable is forcibly stopped, the wind-up effect is so great that slip can not occur and severe strains are produced in the moving parts. If the pivot is too far out the wind-up effect is so small that excessive spring tension is required to prevent slip and the bearings are subjected to a large static load and a larger motor is required to produce the necessary starting torque. As the pivot is moved toward the spindle the wind-up effect increases until at some point it becomes great enough to prevent slipping at any load. This point is defined as the "critical point." An intermediate compromise point is preferably selected slightly outside the critical point, which is determined by the coefficients of friction and angles of wrap on the pulleys, so that the belt will slip only on excessive loads.

The invention will be more clearly understood from the following detailed description and the accompanying drawing in which:

Fig. 1 is a phonograph turntable drive assembly with portions shown in section taken as indicated in Fig. 2, to more clearly illustrate the invention;

Fig. 2 is a bottom view of the assembly; and

Fig. 3 is a diagram showing the location of the pivot of the motor mounting with respect to the resultant of the belt tensions.

Referring now to the drawing, the turntable 10 is rigidly secured by dowel pins 11 to a suitable pulley 12. The turntable and its pulley are mounted on the spindle 13 which is supported by a thrust bearing 14 in the mounting spider 15.

The driving motor 16 may be of any suitable type such, for example, as the two-speed hysteresis type synchronous motor disclosed in a copending application of H. M. Stoller, Serial No. 728,944, filed August 8, 1934. This particular motor is equipped with an external pole changing switch and the diameter of the pulleys 12 and 17 are so related that the turntable is driven without intermediate gearing by the belt 18 at either 33 or 78 revolutions per minute, depending on the position of the switch.

The motor mounting bracket 19 which swings about a pivot 20 in one of the arms of the spider 15, consists of a pair of L-shaped members 21, 22 resiliently held in spaced relation by large rubber washers 23 and smaller similar washers 24, the member 22 being secured to the U-shaped member 25 on the pivot 20. The lower arm of this latter member has an extension piece 26 from which a spring 27 extends to a bracket 28 on the spider to maintain a slight initial tension in the belt 18 as more fully explained below.

The motor 16 is secured to the member 21 by screws 29 which engage the housing 30 of the motor thrust bearing. The members 21 and 22 are aligned with the pivot 20 and held together by screws 31, 32 located in the members so that a line 33 through these points of attachment passes approximately through the center of mass 34 of the motor, the upper screw 32 being substantially in the horizontal plane of the belt.

The resultant belt pull R (Fig. 3) is normally through the pivot 20 and tends to rotate the motor about a horizontal axis through its center of mass but since the washers 23 are at some distance on opposite sides of this center of rotation, and in the vertical plane indicated by the line 35 (Fig. 2) through the center of mass 34 and the pivot 20 they offer a high resistance to further compressional forces so that the motor shaft is not materially deflected from its vertical position. The washers 23 and 24 are relatively free to deflect laterally, however, and extraneous vibrations originating in the motors are accordingly dissipated in the mounting and not transmitted to the turntable.

In a turntable drive the available space largely determines the location of the motor and turntable axes. The proper location of the pivot 20 to produce the desired "wind-up" effect is determined in the following manner. The torque required to drive the turntable determines the value of $T_1-T_2$, the belt tensions as indicated in Fig. 3 and the critical condition where the belt is about to slip is determined from the known formula $$\frac{T_1}{T_2} = \xi^{f\theta}$$

where $\xi$ is 2.718 the base of the napierian system of logarithms, $f$ is the coefficient of friction between the belt and the pulley and $\theta$ is the angle of wrap in radians.

In the structure shown $\theta$ for the turntable pulley is about 5 radians and $\theta$ for the motor pulley about 1.28 radians. The belt 16 is of linen fabric and $f$ for the large pulley is about .15. In order that slipping shall be equally likely to occur at either pulley the coefficient of friction for the motor pulley should be greater than for the large pulley in the inverse ratio of the angles of wrap, that is, about .585. This coefficient is conveniently obtained by making the motor pulley of metal covered with a layer of gum rubber. Then for either pulley $$f\theta = .75 \text{ and } \frac{T_1}{T_2} = \xi^{f\theta} = 1.8.$$

The value of the expression $(T_1-T_2)$ is fixed by the radius of the turntable pulley and the torque necessary to drive the turntable. The absolute values of $T_1$ and $T_2$ for the assumed torque are then determined from these two quotations and from the geometry of Fig. 3 the angle $\beta$ is fixed. The pivot 20 may then be located at any convenient point on the line of the resultant R. The bracket will then be stable and the turntable will operate with the belt on the verge of slipping for this normal load. The belt is highly flexible and since it is very short it is also practically inextensible for normal changes in load so that the rotation of the bracket necessary to adjust the belt tension from starting to full load tension may be so slight that the angle $\beta$ is substantially constant.

When the motor is at rest with pulley 17 in light contact with the belt, the tensions $T_1$ and $T_2$ will be equal and of a very low value and the resultant R will pass below the pivot 20 (as viewed in Fig. 3). The spring 27 is therefore provided to overcome the turning moment of this resultant force and keep the pulley in contact with the belt when the motor is at rest. As soon as the motor pulley begins to turn in a contra-clockwise direction as shown in Fig. 3 tension $T_1$ becomes much greater than tension $T_2$ so that the resultant tension R moves in a contra-clockwise direction to the upper side of the pivot 20 and produces a turning moment which rotates the bracket in a clockwise direction.

As the bracket rotates tension $T_2$ increases and the direction of the resultant R moves clockwise until it passes through the pivot 20 and the system is then stable as long as the load remains constant. A further increase in the load will increase $T_1$ and cause the resultant tension to pass above the pivot and rotate the bracket to a new position of equilibrium. Similarly a decrease in load will result in a decrease in $T_1$ which will cause the resultant to pass below the pivot and move the bracket contra-clockwise to a new position of equilibrium.

Since as pointed out above the actual movement of the bracket to effect the necessary changes in tension may be very slight, tension $T_2$ will be varied to maintain the ratio $$\frac{T_1}{T_2}$$

substantially constant and of a value equal to $$\xi^{f\theta}$$

which is the condition for incipient slipping. Hence the belt tension is automatically adjusted according to this invention to be substantially on the verge of slipping for any load. In actual practice the pivot 20 may be located on a radius of the turntable shaft slightly farther outside the critical point than is necessary theoretically to prevent locking and enough extra tension provided by the spring 27 to prevent slipping for reasonable overload but to allow slipping under abnormal conditions as, for example, when the turntable is forcibly held against rotation.

It will be readily seen that with a structure of this type the belt tension is automatically adjusted to the lowest value which will transmit the torque necessary to drive the load and that wear on the bearings and friction loss in the bearings is kept to a minimum.

While the invention has been described for purposes of illustration with respect to its application to a phonograph turntable drive, it will be understood that the principles of the invention are equally applicable to other belt driven machines and that various modifications may be made within the scope of the following claims.

What is claimed is:

1. In a power transmitting system, a driving pulley, a driven pulley, a belt connecting the pulleys, means for maintaining a low and initial tension in the belt and means for increasing the tension with the load on the driving pulley comprising an arm supporting one of the pulleys and a pivot for the arm located within the angle subtended by the belt at the supported pulley and substantially on the line of the resultant of the belt tensions when the system is operating under normal load.

2. The combination with a driven pulley, a motor having a driving pulley and a belt connecting the pulleys, of an arm supporting the motor, means for maintaining a low initial tension in the belt and a pivot for the arm disposed within the angle subtended by the belt at the driving pulley and substantially on the line of the resultant of the tensions in the belt under normal load whereby an increased load produces a turning moment on the arm to increase the belt tension.

3. In a turntable drive, the combination with a driving motor, a pulley on the turntable and a belt connecting the motor to the pulley, of a supporting bracket for the motor, a pivot for the bracket within the angle subtended at the motor by the belt and substantially on the line of the resultant of the belt pull when the turntable is being driven and upper and lower resilient connections between the motor and the bracket disposed on opposite sides of the motor shaft in a vertical plane through the center of mass of the motor and the pivot of the bracket.

4. In a turntable drive, the combination with means for supporting the turntable, a motor having a driving pulley, a pulley on the turntable and a belt connecting the pulleys, of means for varying the tension of the belt with changes in load comprising a bracket for supporting the motor, a pivot for the bracket located on the turntable supporting means slightly outside the critical point and a spring acting on the bracket to provide initial tension in the belt.

5. In a turntable drive, the combination with means for supporting the turntable, a vertical driving motor, a pulley on the turntable and a belt connecting the motor to the pulley, of means for mounting the motor on the turntable supporting means comprising an upper resilient connecting member substantially in the horizontal plane of the belt and a lower resilient connecting member, said members being on opposite sides of the motor shaft substantially diagonally in line with the center mass of the motor and in the vertical plane of the resultant belt pull when the motor is driving the turntable.

EDMUND R. MORTON.